# 2,704,076

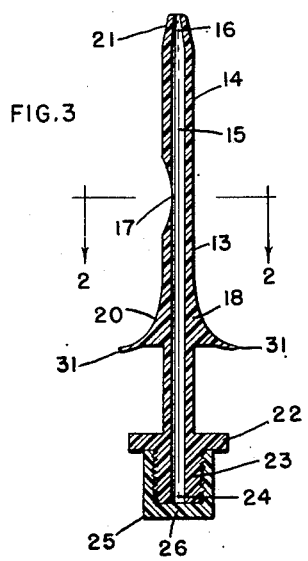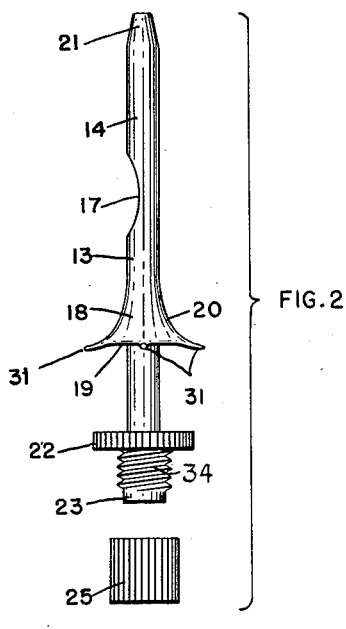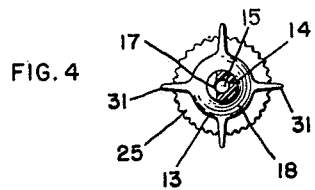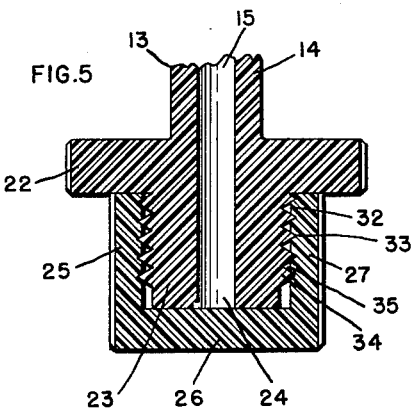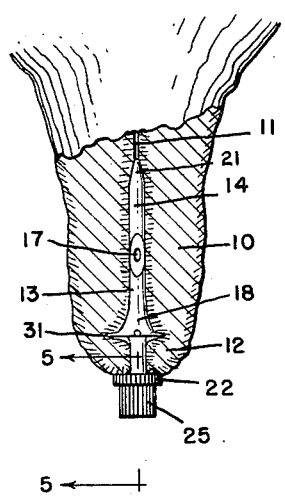
*INVENTOR.*
HERBERT J. LARSON
ATTORNEYS

DILATORS

Herbert J. Larson, Fergus Falls, Minn.

Application February 20, 1953, Serial No. 337,940

4 Claims. (Cl. 128—348)

My invention relates to dilators and particularly to dilators which may be inserted into the milk duct of a cow's teat.

An object of the invention resides in providing a dilator which may be left in the milk duct of the teat for an extended period of time and which will permit of milking without removal.

Another object of the invention resides in providing a dilator comprising a tubular stem having a bore therein open at its outer end and adapted to communicate with the milk duct and to provide a closure for the outer end of the bore.

A still further object of the invention resides in providing a construction whereby the dilator is positively maintained within the milk duct.

Another object of the invention resides in constructing the tubular stem of the dilator with a tapered enlargement and in providing at the enlargement fingers which project outwardly therefrom and restrain unintentional removal from the cow's teat.

A still further object of the invention resides in providing a threaded neck on the lower end of the stem and in further providing a threaded cap for application to said neck to close the passageway in the dilator.

An object of the invention resides in constructing the dilator and cap of resilient material and in forming the threads in either the neck or cap incomplete to provide shallow grooves therebetween and the threads in the other thereof complete and tightly fitting in the grooves so that the threads of the latter will compress when engaged with the former and form a tight seal between the cap and neck and prevent accidental disengagement of the cap from the neck.

Other objects of the invention reside in the novel combination and arrangement of parts and in the details of construction hereinafter illustrated and/or described.

In the drawings:

Fig. 1 is an elevational view partly in section of the teat of a cow with a dilator embodying the invention applied thereto.

Fig. 2 is an exploded elevational view of the dilator removed from the cow's teat and drawn to an enlarged scale.

Fig. 3 is a longitudinal sectional view similar to Fig. 2 and showing the cap applied to the neck of the dilator.

Fig. 4 is a cross sectional view taken on line 4—4 of Fig. 3.

Fig. 5 is an enlarged cross sectional view taken on line 5—5 of Fig. 1.

For the purpose of illustrating the invention a cow's teat has been shown which is indicated by the reference numeral 10. The milk duct is indicated at 11 and the sphincter muscle which closes the said duct is situated at 12.

The invention proper is designated by the reference numeral 13 and consists of a stem 14 tubular in form and which has a bore 15 in the same running longitudinally thereof. In the stem 14 is formed an opening 16 which communicates with the bore 15 at the inner end of the same. In addition a lateral opening 17 is formed in the stem 14 which is situated intermediate the ends of the stem and which also communicates with the bore 15. Both of these openings, when the dilator is properly inserted into the milk duct 11 of the cow's teat 10 are adapted to communicate with said duct. The inner end of the stem 14 is formed with a tapered tip 21 for assisting in inserting the stem into the milk duct 11.

For holding the dilator in position within the milk duct 11 an enlargement 18 is formed on the stem 14 and which is so situated that it lies well within the sphincter muscle 12. This enlargement has at its lower end a shoulder 19 which is substantially normal to the axis of the stem. The inner end of said enlargement is formed with a taper 20 which merges gradually into the stem. By means of this construction the stem 14 is readily inserted into the milk duct 11. Encircling the enlargement 18 and issuing outwardly therefrom at the locality of the shoulder 19 are a plurality of flexible fingers 31. These fingers bend when the dilator stem 14 is inserted into the cow's teat and exert an outward pressure above the sphincter muscle 12 which assists in maintaining the dilator properly applied to the cow's teat and restrains accidental removal of the dilator therefrom.

At the end of the stem 14 the dilator 13 is formed with a flange 22 which is considerably greater in diameter than the stem 14 and enlargement 18. This flange is adapted to engage the end of the teat 10 and limits the movement of the dilator into the teat.

At the lower end of the dilator and issuing outwardly from the flange 22 is a neck 23. The bore 15 extends through this neck and said neck has an opening 24 at its lower end communicating with the bore 15 and which is adapted to bring said bore into communication with the exterior. This opening is adapted to be closed by means of a cap 25 having an end wall 26 and a cylindrical wall 27. The wall 27 has formed upon the inner surface thereof threads 32 which are incomplete and which form shallow grooves 33 therebetween. In the neck 23 are formed ordinary threads 34 which fit tightly in the grooves 33 and when the cap 25 is screwed on the neck 23 the threads 34 become compressed and expand into the spaces 35 formed between the threads 34 by the threads 32 being incomplete. The cap 25 is thus held in position upon the dilator and when engaging the flange 22 forms a tight closure for the device.

The entire dilator is preferably formed of a flexible plastic material so that the stem may readily be bent to prevent excessive discomfort to the cow. It was found that polyethylene was extremely suitable and in addition had a medicinal effect on the teat tending to make the teat heal rapidly.

The use of the invention is obvious. The dilator is applied to the teat by merely inserting the stem 14 into the milk duct. As the enlargement 18 and the fingers 31 enter the duct, the fingers 31 bend while passing the sphincter muscle and upon reaching the interior of the duct spread out, as shown in Fig. 1, to hold the device firmly in place. Medicine may be readily injected into the teat by providing the injecting device with a nozzle formed similar to cap 25 and attaching the same to said neck after the cap has been removed. When it becomes desirable to milk the cow, the cap 25 is removed and the teat cup of the milking machine applied in the usual manner and milking proceeded with as customary. Upon completion of the milking the cap is replaced and the dilator retained within the milk duct.

The advantages of the invention are manifest. The dilator is easily and quickly applied. Once the dilator is in position the same need not be removed until the teat has healed. With the instant invention milking can be accomplished without removal of the dilator. The dilator is highly sanitary and contamination from contact of the dilator with other objects is entirely eliminated. The dilator assists in causing the teat to heal and does not seem to give any appreciable discomfort to the cow after the cow becomes used to the same. The dilator can be constructed at a nominal expense. The fingers on the enlargement of the dilator help hold the dilator applied to the cow's teat and restrain accidental removal thereof. By means of the thread construction used with the cap and neck, the cap is easily applied and removed and is frictionally held in position. At the same time, leakage of milk past the cap is prevented.

Changes in the specific form of my invention, as herein described, may be made within the scope of what is claimed without departing from the spirit of my invention.

Having described my invention, what I claim as new and desire to protect by Letters Patent is:

1. A dilator comprising a tubular stem for insertion in the milk duct of a cow's teat, said stem having a bore and being formed with an opening therein communicating with said bore and adapted to communicate with the milk duct, a number of flexible fingers on said stem encircling the same and extending outwardly therefrom and situated at a locality above the end of the stem greater than the distance between the sphincter muscle and the end of the cow's teat, said bore being open at the lower end of the same and a removable closure for the lower end of the bore.

2. A dilator comprising a tubular stem for insertion in the milk duct of a cow's teat, said stem having a bore and being formed with an opening therein communicating with said bore and adapted to communicate with the milk duct, an enlargement on said stem having a downwardly facing shoulder, a number of flexible fingers encircling said stem and extending outwardly from said enlargement at the locality of said shoulder and situated at a locality above the end of the stem greater than the distance between the sphincter muscle and the end of the cow's teat, said bore being open at the lower end of the same and a removable closure for the lower end of the bore.

3. A dilator comprising a tubular stem for insertion in the milk duct of a cow's teat, said stem having a bore and being formed with an opening therein communicating with said bore and adapted to communicate with the milk duct, a flange on said stem at the lower end thereof, a neck connected to said flange constructed of resilient material and disposed below said flange, said bore extending through said flange and neck, threads formed on said neck, a cap constructed of resilient material and closing said passageway to prevent discharge of milk from the bore of said stem, truncated threads formed on said cap to provide shallow grooves therebetween, the threads on said neck being adapted to be received in said grooves and tightly fitting the thread in said cap, the tops of said truncated threads forming spaces within the threads of said neck and into which the threads of the neck may flow when the same are compressed through application of the cap to the neck.

4. A dilator comprising a tubular stem for insertion in the milk duct of a cow's teat, said stem having a bore and being formed with an opening therein communicating with said bore and adapted to communicate with the milk duct, a flange on said stem at the lower end thereof, a neck connected to said flange and disposed below said flange, said bore extending through said flange and neck, a cap closing said passageway and preventing discharge of milk from the bore of said stem, said neck and cap having overlying parts, truncated threads formed on one of said parts to provide shallow grooves therebetween, said other part being constructed of resilient material, complete threads formed on the other of said parts and tightly fitting into said grooves, said truncated threads forming with the complete threads spaces into which the complete threads may expand when the cap is applied to the neck.

References Cited in the file of this patent

UNITED STATES PATENTS

| | | |
|---|---|---|
| 1,688,795 | Aas | Oct. 23, 1928 |

FOREIGN PATENTS

| | | |
|---|---|---|
| 346,011 | Germany | Dec. 22, 1921 |